United States Patent [19]

Howard

[11] Patent Number: 5,130,199
[45] Date of Patent: Jul. 14, 1992

[54] FLEXIBLE GRAPHITE EXPANDABLE SEAL AND METHOD

[75] Inventor: Ronald A. Howard, Brook Park, Ohio

[73] Assignee: UCAR Carbon Technology Corporation, Danbury, Conn.

[21] Appl. No.: 658,010

[22] Filed: Feb. 20, 1991

[51] Int. Cl.$^5$ .............................................. B32B 27/20
[52] U.S. Cl. .................... 428/408; 428/407; 428/323; 428/411.1
[58] Field of Search .............. 428/408, 323, 403, 407, 428/411.1; 277/227, 228, DIG. 6; 524/495, 496, 847

[56] References Cited

U.S. PATENT DOCUMENTS

| | | | |
|---|---|---|---|
| 3,404,061 | 10/1968 | Shane et al. | 428/460 |
| 3,416,992 | 12/1968 | Amos | 428/408 |
| 3,492,197 | 1/1970 | Olstowski et al. | 428/422 |
| 3,726,738 | 4/1973 | Yellon et al. | 428/408 |
| 4,086,380 | 4/1978 | Juel et al. | 428/408 |
| 4,190,257 | 2/1980 | Schnitzelr | 277/102 |
| 4,265,952 | 5/1981 | Caines | 428/408 |
| 4,277,532 | 7/1981 | Czepel et al. | 428/323 |
| 4,305,567 | 12/1981 | Lunt | 277/DIG. 6 |
| 4,414,142 | 11/1983 | Vogel et al. | 252/511 |
| 4,530,949 | 7/1985 | Atkinson et al. | 524/495 |
| 4,704,231 | 11/1987 | Chung | 524/496 |
| 4,799,956 | 1/1989 | Vogel | 252/506 |
| 4,946,892 | 8/1990 | Chung | 524/847 |

*Primary Examiner*—Ellis P. Robinson
*Assistant Examiner*—Archene A. Turner
*Attorney, Agent, or Firm*—E. Lieberstein

[57] ABSTRACT

An expandable seal of flexible graphite composed of a prestressed flexible graphite composition of a mixture of flexible graphite and a thermoplastic material having a preselected melting temperature corresponding to the temperature at which the seal is to commence expansion. The flexible graphite composition is prestressed under a compressive force and a temperature such that the thermoplastic material is in a plastic state.

4 Claims, No Drawings

FLEXIBLE GRAPHITE EXPANDABLE SEAL AND METHOD

FIELD OF INVENTION

This invention relates to an expandable seal of flexible graphite and to a method of forming a flexible graphite seal which is expandable in-situ at elevated temperatures.

BACKGROUND OF INVENTION

An in-situ expandable gasket is required in certain applications where a clamping force cannot be applied to the gasket to form a seal. One such application is in a turbine compressor for providing cabin pressurization in an airplane. The compressor is constructed in multiple stages with the rotor blades detachably connected to the rotor leaving a small clearance between the base of each blade tip and the rotor disk. In the lower stages of compression where the temperature is relatively low an elastomeric polymer or rubber material may be placed into this space to form a seal. If the space is not sealed pressurized cabin air will escape through this space reducing efficiency. However, at the higher stages of compression where the temperature is relatively high and may rise to 400° F. or higher, conventional elastomer or rubber gaskets deteriorate and cannot withstand the environment. Other conventional gasket materials which can endure higher temperatures including flexible graphite depend upon the application of a clamping force to form a seal. An expandable seal is desirable for applications which do not depend upon a clamping force to form a seal and particularly where the seal must be effective above ambient temperatures.

SUMMARY OF THE INVENTION

It has been discovered in accordance with the present invention that an expandable seal can be formed from a prestressed flexible graphite composition comprising flexible graphite and a thermoplastic material in which the composition is prestressed under a compressive force and at a temperature such that the thermoplastic material is in a "plastic state" during compression of the flexible graphite. The term "plastic state" as used herein identifies the physical condition of the thermoplastic material when subjected to increased temperature and/or pressure so as to cause the thermoplastic material to become soft or fluid. The expandable flexible graphite seal of the present invention comprises a rigid body formed from a mixture of a thermoplastic material having a preselected melting temperature corresponding to the temperature at which the seal is to commence expansion and particles of flexible graphite bonded together by said thermoplastic material under a compressive force.

The method of the present invention for forming an expandable seal which expands at a preselected elevated temperature above ambient comprises the steps of:

intermixing particles of flexible graphic with a thermoplastic material having a melting temperature corresponding to said preselected temperature;

subjecting the mixture of particles and thermoplastic material to a temperature sufficient to cause said thermoplastic material to become plastic;

compressing said mixture while said thermoplastic material is in the plastic state; and allowing said thermoplastic material to become rigid while under said compressive force.

DETAILED DESCRIPTION OF THE PREFERRED EMBODIMENT

"Flexible graphite" as used herein is produced from the exfoliated reaction product of rapidly heated graphite flakes or particles which have been treated with an agent that intercalates into the crystal structure of the graphite to expand the graphite flakes at least 80 or more time in the direction perpendicular to the carbon layers in the crystal structure. The exfoliated graphite flakes are vermiform in appearance and are commonly referred to as worms. The worms are then compressed into sheets to form foils with a density related to the applied pressure. The sheets are flexible and can be further compressed into a foil and/or cut into various shapes in the form of a ribbon, tape or the like.

In accordance with the present invention particles of flexible graphite are formed by shredding or milling a sheet of flexible graphite of any desired density. The size of the particles of flexible graphite are important only to the extent that they must be of a size large enough to maintain their resiliency in a prestressed state as will hereafter be discussed at length. In general, the particles of flexible graphite should be screened to a size larger than 200 mesh and smaller than 4 mesh, preferably between 100 mesh and 10 mesh. The screened particles are then dry blended with a thermoplastic material preferably in powder form.

Any thermoplastic material, preferably one having a low melting temperature, may be used to form a suitable mixture with particles of flexible graphite. Thermoplastic polymers which are reaction products of ethylene glycol and ethylene oxide such as polyethylene or the commercially available product "POLYOX", a trademark product of Union Carbide Corporation, is particularly suited to the present invention. The weight ratio of thermoplastic powder to particles of flexible graphite is primarily dependent upon the density of the flexible graphite particles, the particle sizing and the density of the thermoplastic. In general, on a weight basis, a higher density flexible graphite requires a higher percentage of thermoplastic. Most commercially available flexible graphite "foil" sheet has a density of about 70 lb/ft$^3$. For this standard density flexible graphite product a weight ratio of 100 parts of the particles of flexible graphite to 25 parts of thermoplastic powder is acceptable. The preferred range is between 10–35% by weight thermoplastic powder with the remainder being particles of flexible graphite.

The dry blended mixture of flexible graphite particles and thermoplastic powder are compressed under a compressive load with the thermoplastic material in a plastic state. The dry blended mixture may be fed into a preheated mold which is allowed to cool as pressure is applied or the mold may be heated as pressure is applied and then allowed to cool with the mixture under compression. The objective is to maintain the particles of flexible graphite incorporated in a softened thermoplastic medium under a compressive force while allowing the thermoplastic material to harden. Once the thermoplastic material has become rigid the compressive force may be withdrawn and the particles of flexible graphite will be held in this prestressed state until the temperature is raised to a level equal to the softening point of the thermoplastic material. At this temperature level the prestressed flexible graphite expands to its unstressed volume. The degree of expansion is based on the amount of compression with a preferred minimum pressure of 1,000 psi.

In one example illustrative of the invention, particles of flexible graphite were milled from a standard "GRAFOIL" ® flexible graphite sheet (GRAFOIL is a registered trademark of UCAR CARBON TECHNOLOGY CORPORATION) and mixed with twenty percent (20%) by weight POLYOX powder to form a sample. The blend was placed in a steel mold that had been preheated to 80° C. A pressure of 3000 psi was applied to the blend while the mold cooled to 30° C. The sample was then removed. The density of the sample was approximately 95 lbs/ft$^3$. On heating the sample to 150° C., the sample expanded in thickness 11.9%.

What I claim is:

1. A flexible graphite seal which is expandable in-situ at an elevated temperature above ambient comprising; a rigid body formed from a mixture of thermoplastic material having a preselected melting temperature corresponding to the temperature at which the seal is to commence expansion and particles of flexible graphite formed by communicating a compressed sheet of exfoliated graphite flake with the particles of flexible graphite bonded together by said thermoplastic material in a plastic state and under a compressive force which is maintained until said material solidifies into said rigid body such that the flexible graphite particles are locked in a state of compression in said rigid body.

2. A flexible graphite seal as defined in claim 1 wherein said thermoplastic material constitutes 10–35% by weight of said mixture.

3. A flexible graphite seal as defined in claim 2 wherein said particles of flexible graphite are in a size range between 200 mesh and 4 mesh.

4. A flexible graphite seal as defined in claim 3 wherein said particles of flexible graphite are in a size range between 100 mesh and 10 mesh.

* * * * *